US009124901B2

(12) United States Patent
Kim et al.

(10) Patent No.: US 9,124,901 B2
(45) Date of Patent: Sep. 1, 2015

(54) METHOD AND APPARATUS FOR ENCODING/DECODING IMAGES CONSIDERING LOW FREQUENCY COMPONENTS

(75) Inventors: Sunyeon Kim, Seoul (KR); Jeongyeon Lim, Gyeonggi-do (KR); Haekwang Kim, Seoul (KR); Byeungwoo Jeon, Gyeonggi-do (KR); Joohee Moon, Seoul (KR); Yunglyul Lee, Seoul (KR); Jongki Han, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 708 days.

(21) Appl. No.: 13/497,755

(22) PCT Filed: Sep. 3, 2010

(86) PCT No.: PCT/KR2010/006018
§ 371 (c)(1),
(2), (4) Date: Apr. 24, 2012

(87) PCT Pub. No.: WO2011/037337
PCT Pub. Date: Mar. 31, 2011

(65) Prior Publication Data
US 2012/0201296 A1 Aug. 9, 2012

(30) Foreign Application Priority Data

Sep. 23, 2009 (KR) .................. 10-2009-0090283

(51) Int. Cl.
*H04N 7/32* (2006.01)
*H04N 19/86* (2014.01)
(Continued)

(52) U.S. Cl.
CPC ............... *H04N 19/86* (2014.11); *H04N 19/61* (2014.11); *H04N 19/91* (2014.11)

(58) Field of Classification Search
CPC ................................................ H04N 19/00781
USPC ...................................................... 375/240.03
See application file for complete search history.

(56) References Cited

U.S. PATENT DOCUMENTS 6,229,854 B1 * 5/2001 Kikuchi et al. .......... 375/240.27
6,700,933 B1 * 3/2004 Wu et al. .................. 375/240.16
(Continued)

FOREIGN PATENT DOCUMENTS

KR 10-2005-0052505 6/2005
KR 10-0871588 12/2008
(Continued)

OTHER PUBLICATIONS

Korean Office Action dated Oct. 29, 2013.
(Continued)

*Primary Examiner* — William C Vaughn, Jr.
*Assistant Examiner* — Luis Perez Fuentes
(74) *Attorney, Agent, or Firm* — Lowe Hauptman & Ham, LLP

(57) ABSTRACT

The present disclosure relates to a video encoding/decoding method and apparatus that account for low frequency components. The method includes generating a reconstructed block by performing a predictive encoding on a current block and generating encoded image data, and generating encoded low frequency data by encoding a low frequency component of an error block generated through subtraction of the reconstructed block from the current block, thereby improving the compression efficiency while reducing blocking effects due to transform and quantization operations by encoding images accounting for low frequency components.

21 Claims, 11 Drawing Sheets

(51) Int. Cl.
*H04N 19/61* (2014.01)
*H04N 19/91* (2014.01)

(56) References Cited

U.S. PATENT DOCUMENTS

| | | | | |
|---|---|---|---|---|
| 7,583,730 | B2* | 9/2009 | Wu et al. | 375/240.12 |
| 8,351,502 | B2* | 1/2013 | Lee et al. | 375/240.12 |
| 8,532,176 | B2* | 9/2013 | Segall | 375/240.11 |
| 8,879,857 | B2* | 11/2014 | Raveendran et al. | 382/232 |

FOREIGN PATENT DOCUMENTS

| | | |
|---|---|---|
| KR | 10-2009-0079939 | 7/2009 |
| KR | 1020090095011 A | 9/2009 |

OTHER PUBLICATIONS

International Search Report mailed Apr. 22, 2011 for PCT/KR2010/006018.

\* cited by examiner

| DC | AC1 | 0 | 0 | 0 | 0 | 0 | 0 |
|----|-----|---|---|---|---|---|---|
| 0  | 0   | 0 | 0 | 0 | 0 | 0 | 0 |
| 0  | 0   | 0 | 0 | 0 | 0 | 0 | 0 |
| 0  | 0   | 0 | 0 | 0 | 0 | 0 | 0 |
| 0  | 0   | 0 | 0 | 0 | 0 | 0 | 0 |
| 0  | 0   | 0 | 0 | 0 | 0 | 0 | 0 |
| 0  | 0   | 0 | 0 | 0 | 0 | 0 | 0 |
| 0  | 0   | 0 | 0 | 0 | 0 | 0 | 0 |

*FIG. 7*

METHOD AND APPARATUS FOR ENCODING/DECODING IMAGES CONSIDERING LOW FREQUENCY COMPONENTS

CROSS REFERENCE TO RELATED APPLICATION

This application claims the priority of Korean Patent Application No. 10-2009-0090283, filed on Sep. 23, 2009 in the KIPO (Korean Intellectual Property Office). Further, this application is the National Phase application of International Application No. PCT/KR2010/006018 filed Sep. 3, 2010, which designates the United States and was published in Korean.

TECHNICAL FIELD

The present disclosure relates to a video encoding/decoding method and an apparatus that account for low frequency components. More particularly, the present disclosure relates to a method and an apparatus for encoding videos by considering low frequency components to improve the compression efficiency while reducing blocking effects due to transform and quantization operations.

BACKGROUND ART

The statements in this section merely provide background information related to the present disclosure and may not constitute prior art.

Without a compression process, video data requires extensive hardware resources including memories to store or transmit the data since the video data carries much more amount of data that audio data or still image data. Accordingly, it is typical in a video data storage or transmission to use an encoder for compressively store or transmit the video data, whereas a decoder receives the compressed video data, and decompresses the same for a reconstruction into the original video.

Recently developed video compressing technologies attempt to effectively compress videos by using a multiple reference frame technology and a technology for encoding quantized transform coefficients through entropy coding such as Context based Variable Length Coding (CAVLC). However, such video compression technologies issue blocking effects and the like because they involve predicting macroblocks of images to obtain a residual block which then undergoes dividing into transform units, transforming into a frequency domain, quantizing, and encoding.

As the typical image compression technologies deal with the blocking effects to be removed through deblocking-filtering the images which are reconstructed after encoding and decoding thereof, deblocking filters in this operation undesirably remove even the high frequency components which are actually present in the images.

DISCLOSURE

Technical Problem

Therefore, the present disclosure has been made in view of the above mentioned problems to provide in one aspect a method and an apparatus for encoding videos by accounting for low frequency components to improve the compression efficiency while reducing blocking effects due to transform and quantization operations.

SUMMARY

An aspect of the present disclosure provides a video encoding method including: generating a reconstructed block by performing a predictive encoding on a current block and generating encoded image data; and generating encoded low frequency data by encoding a low frequency component of an error block generated by subtracting the reconstructed block from the current block.

Another aspect of the present disclosure provides a video encoding apparatus including: an image encoder for generating a reconstructed block by performing a predictive encoding on a current block and generating encoded image data; and a low frequency encoder for generating encoded low frequency data by encoding a low frequency component of an error block generated through subtraction of the reconstructed block from the current block.

Yet another aspect of the present disclosure provides a video decoding method including: generating a reconstructed block by performing a predictive decoding on encoded image data extracted from a bitstream; reconstructing an error block by decoding encoded low frequency data extracted from the bitstream; and reconstructing a current block by adding the error block to the reconstructed block.

Yet another aspect of the present disclosure provides a video decoding apparatus including: an image decoder for generating a reconstructed block by performing a predictive decoding on encoded image data extracted from a bitstream; a low frequency decoder for reconstructing an error block by decoding encoded low frequency data extracted from the bitstream and reconstructing a current block by adding the error block to the reconstructed block.

Advantageous Effects

Accordingly, the present disclosure encodes videos by accounting for low frequency components, so that the compression efficiency can be improved while reducing blocking effects due to the transform and quantization operations.

DESCRIPTION OF DRAWINGS

FIG. 7 is a diagram illustrating transform blocks generated through a combination with additional transform coefficients according to an aspect of the present disclosure;

DETAILED DESCRIPTION

Figure 1:
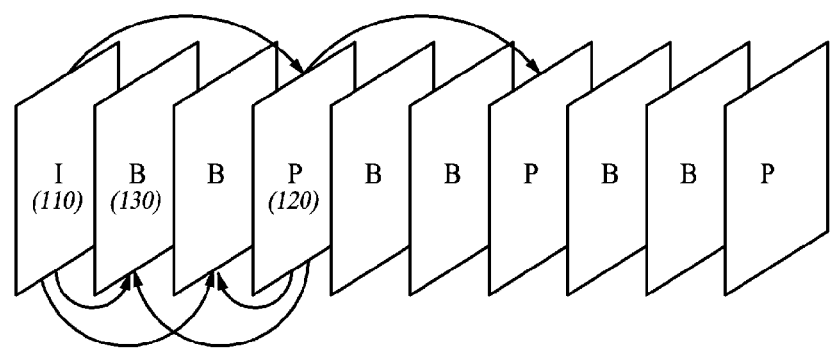
FIG. 1 is a view illustrating pictures included in a video.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a view illustrating pictures included in a video.

There are various video encoding methods. A typical video encoding method encodes an image in the unit of pixels through dividing the image in the unit of pixels, or encodes the image in the unit of blocks through dividing the image in the unit of blocks. When the image is encoded in the unit of blocks, one picture to be encoded among a series of pictures included in the video may be divided into macroblocks and subblocks included in the macroblock, and the block may be predicted and encoded in the unit of divided blocks.

In general, since a video has a frame-rate of 30 pictures per second and, the visual difference between neighboring pictures is too small to be sensed somehow by human eyes. Accordingly, when the video outputs 30 pictures per second, the viewer recognizes that the respective pictures make a continuous motion.

Accordingly, when a previous picture is visually similar to a current picture, an unknown pixel value of an image of the current picture may be predicted from a previously known pixel value of the image of the previous picture. Such a prediction method is called inter prediction. The inter prediction is performed based on a motion prediction technique. The motion prediction is performed in a scheme of referring to a previous picture or referring to both the previous picture and a future picture based on a time axis. The picture that is referenced in encoding or decoding the current picture is called a reference picture.

Referring to FIG. 1, a video includes a series of still images. The still images are divided in the unit of Groups of Pictures (GoPs). Each still image is called a picture or a frame. One GoP includes picture I 110, picture Ps 120, and picture Bs 130. Picture I 110 is a picture self-encoded without using a reference picture, picture P 120 and picture B 130 are pictures encoded through performing motion estimation and motion compensation by using the reference picture. Particularly, picture B 130 is a picture encoded by predicting a past picture and a future picture in a forward direction and a backward direction, i.e. bi-directionally.

Referring to FIG. 1, the motion estimation and the motion compensation for encoding picture P 120 use picture I 110 or picture P 120 as a reference picture. The motion estimation and the motion compensation for encoding picture B 130 use picture I 110 and picture P 120 as reference pictures.

Figure 2:
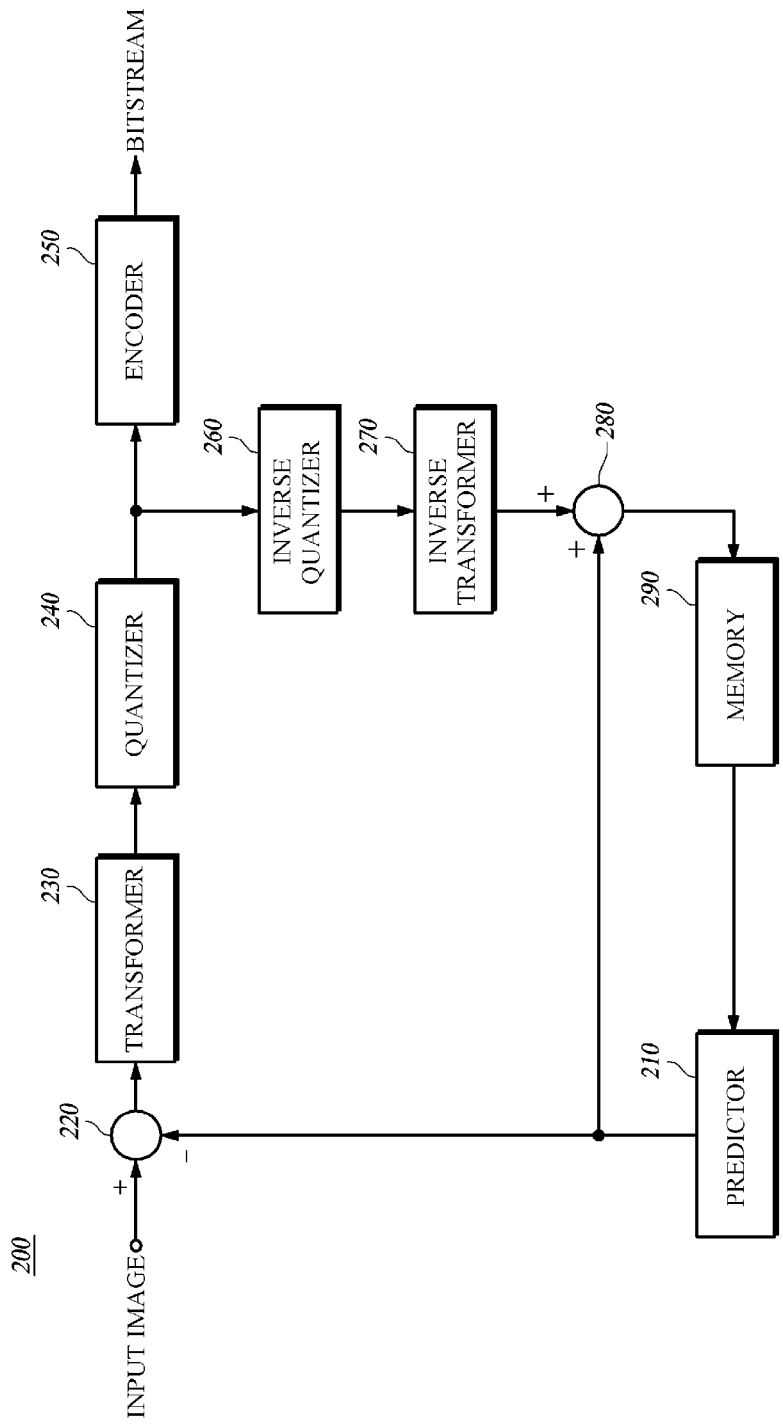
FIG. 2 is a block diagram schematically illustrating a video encoding apparatus.

FIG. 2 is a block diagram schematically illustrating a video encoding apparatus.

The video encoding apparatus 200 includes a predictor 210, a subtracter 220, a transformer 230, a quantizer 240, an encoder 250, an inverse quantizer 260, an inverse transformer 270, an adder 280, and a memory 290. The video encoding apparatus 200 refers to a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communication between various devices or wired/wireless communication networks, a memory for storing various programs for encoding images and related data, and a microprocessor for executing the programs to effect operations and controls.

The predictor 210 generates a predicted block by predicting a current block. That is, the predictor 210 predicts a pixel value of each pixel of a current block to be encoded in an image to generate a predicted block having a predicted pixel value of each pixel. Here, the predictor 210 may predict the current block by using the intra prediction or the inter prediction.

The subtracter 220 generates a residual block by subtracting the predicted block from the current block. That is, the subtracter 220 calculates a difference between a pixel value of each pixel of the current block to be encoded and the predicted pixel value of each pixel predicted in the predictor 210, to generate the residual block having a residual signal in the form of a block.

The transformer 230 transforms the residual block. Specifically, the transformer 230 transforms a residual signal of the residual block outputted from the subtracter 220 into the frequency domain to transform each pixel value of the residual block into transform coefficients. Here, the transformer 230 may transform the residual signal to the frequency domain by using various transform methods, such as the Hadamard transform and the discrete cosine transform (DCT) based transform, for transforming an image signal in a spatial axis based on the frequency axis, wherein the residual signal transformed to the frequency domain is the transform coefficients.

The quantizer 240 quantizes the transformed residual block. Specifically, the quantizer 240 quantizes the transform coefficients of the residual block outputted from the transformer 230 to output the residual block having the quantized transform coefficients. Here, the quantizer 240 may perform the quantization by using the dead zone uniform threshold quantization (DZUTQ) or the quantization weighted matrix among their various improvement options.

The encoder 250 encodes the quantized residual blocks to generate a bitstream. Specifically, the encoder 250 scans quantized frequency coefficients of the residual block outputted from the quantizer 240 in a zigzag scanning or other various scanning methods to generate a quantized frequency coefficient string, and encodes the quantized frequency coefficient string by using various encoding techniques such as the entropy encoding. In this event, the encoder 250 may additionally encode various pieces of information, such as information necessary for the prediction.

The inverse quantizer 260 inversely quantizes the residual block quantized by the quantizer 240. The inverse transformer 270 inversely transforms the residual block inversely quantized by the inverse quantizer 260. Here, the inverse quantizer 260 and the inverse transformer 270 may perform the inverse quantization and the inverse transform by inversely applying the quantization method and the transform method used in the quantizer 240 and the transformer 230.

The adder 280 adds the predicted block predicted in the predictor 210 to the residual block reconstructed by the inverse transformer 270 to reconstruct the current block. The memory 290 stores the reconstructed current block outputted from the adder 280 as a reference picture in the unit of pictures such that the reconstructed current block may be used as the reference picture when the predictor 210 encodes a next block of the current block or a different future block.

Although it is not illustrated in FIG. 2, the video encoding apparatus 200 may additionally include a deblocking filter for deblocking-filtering the reconstructed current block, or the like. Here, the deblocking-filtering refers to an operation of reducing a block distortion generated while an image is encoded in the unit of blocks, and may optionally select one of a method of applying the deblocking filter to a block boundary and a macroblock boundary, a method of applying the deblocking filter only to the macroblock boundary, or a method of using no deblocking filter.

In the meantime, since the residual block generated by subtracting the predicted block from the current block is transformed and quantized, errors are generated in the process of the transform and the quantization, and thus the bitstream generated by the encoder 250 includes the errors generated during the process of the transform and the quantization. Further, the transformed and quantized residual block is inversely quantized and inversely transformed again and added to the predicted block, to be reconstructed to the current block. In this event, the reconstructed current block includes the errors generated during the process of the transform and the quantization.

That is, when it is assumed that the original current block is A and the predicted block is B, the residual block A-B, which is the difference between the current block and the predicted block, is transformed and quantized. In this event, an error component E may be generated, so that the encoded data within the finally encoded and outputted bitstream is (A−B)+E. Further, since the reconstructed current block stored in the memory 290 is generated by adding the reconstructed residual block (A−B)+E to the predicted block B, the current block A+E in which the error E is added to the original current block A is stored as the reference picture.

Figure 3:
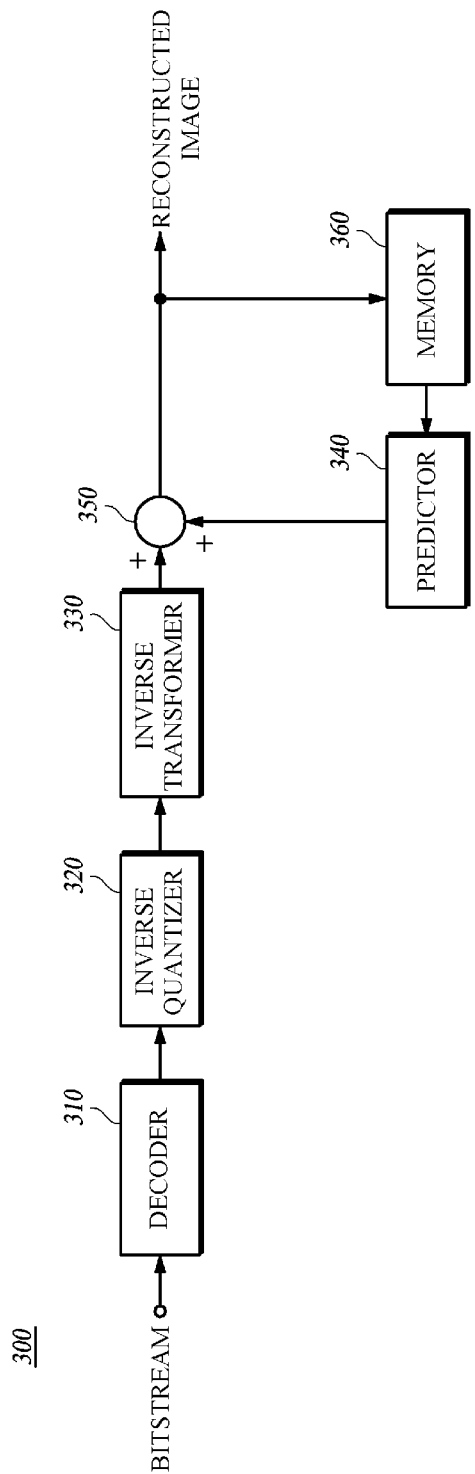
FIG. 3 is a block diagram schematically illustrating a video decoding apparatus.

FIG. 3 is a block diagram schematically illustrating a video decoding apparatus.

The video decoding apparatus 300 includes a decoder 310, an inverse quantizer 320, an inverse transformer 330, a predictor 340, an adder 350, and a memory 360. The video decoding apparatus 300 may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communication between various devices or wired/wireless communication networks, a memory for storing various programs for decoding images and related data, and a microprocessor for executing the programs to effect operations and controls.

The decoder 310 decodes the residual block encoded from the bitstream to reconstruct the quantized residual block. In this event, the decoder 310 may decode the encoded residual block by inversely performing the encoding process performed in the encoder 250 of the video encoding apparatus 200.

The inverse quantizer 320 inversely quantizes the residual block reconstructed by the decoder 310. The inverse transformer 330 inversely transforms the residual block inversely quantized by the inverse quantizer 320. The predictor 340 predicts the current block to generate the predicted block. The adder 350 adds the residual block inversely transformed by the inverse transformer 330 to the predicted block generated by the predictor 340 to reconstruct the current block. The memory 360 stores the reconstructed current block outputted from the adder 350 as the reference picture in the unit of pictures such that the predictor 340 may use the stored current block as the reference picture.

Figure 4:
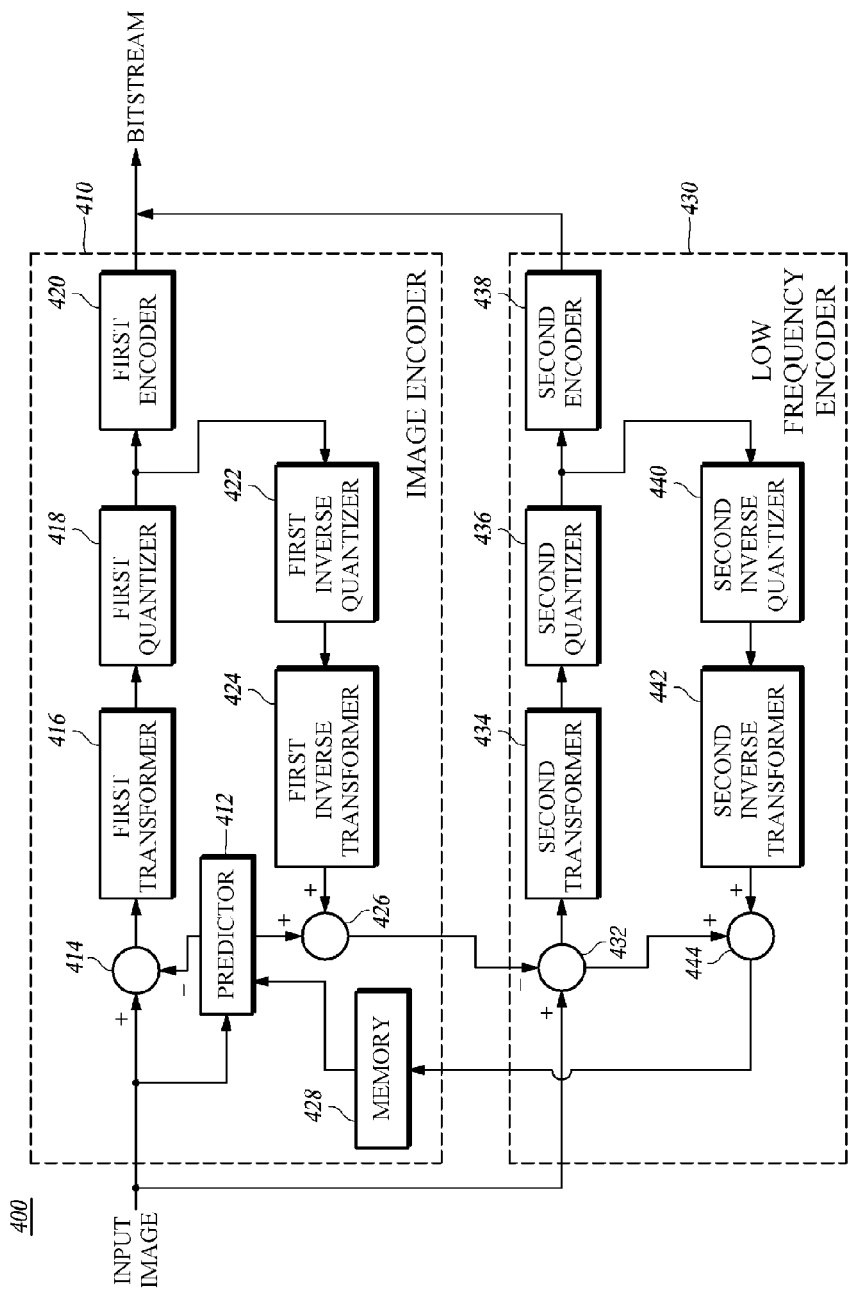
FIG. 4 is a block diagram schematically illustrating a video encoding apparatus according to an aspect of the present disclosure.

Although it is not illustrated in FIG. 4, the aforementioned video decoding apparatus 300 may additionally include the deblocking filter for deblocking-filtering the reconstructed current block, etc.

FIG. 4 is a block diagram schematically illustrating a video encoding apparatus according to an aspect of the present disclosure.

The video encoding apparatus 400 according to an aspect of the present disclosure may include an image encoder 410 and a low frequency encoder 430.

The image encoder 410 performs a predictive encoding on a current block to generate encoded image data and a reconstructed block. Specifically, the image encoder 410 predicts a current block to generate a predicted block, subtracts the predicted block from the current block to generate a residual block, transforms and quantizes the residual block in first transform units to generate a quantized transform coefficient of the residual block, encodes the quantized transform coefficient of the residual block to generate encoded image data, inversely quantizes and inversely transforms the quantized transform coefficient of the residual block to reconstruct the residual block, and adds the reconstructed residual block to the predicted block to generate the reconstructed block.

To this end, as illustrated in FIG. 4, the image encoder 410 includes a predictor 412, a first subtracter 414, a first transformer 416, a first quantizer 418, a first encoder 420, a first inverse quantizer 422, a first inverse transformer 424, a first adder 426, and a memory 428. Here, the operations and the functions of the predictor 412, the first subtracter 414, the first transformer 416, the first quantizer 418, the first encoder 420, the first inverse quantizer 422, the first inverse transformer 424, the first adder 426, and the memory 428 are similar to or the same as those of the predictor 210, the subtracter 220, the transformer 230, the quantizer 240, the encoder 250, the inverse quantizer 260, the inverse transformer 270, the adder 280, and the memory 290 already described through FIG. 2, so their detailed description will be omitted.

However, the first transformer 416 may transform the residual block in the first transform units in operation. Such first transform units may be the transform in a form of a rectangle, i.e. P×Q transform, wherein P≠Q, such as 4×8 transform, 8×4 transform, 16×8 transform, and 8×16 transform, in which the number of transverse pixels is different from that of longitudinal pixels of the transform block. Further, the first transform units may be one of 4×4 transform, 8×8 transform, 16×16 transform, 4×8 transform, 8×4 transform, 16×8 transform, and 8×16 transform, or a combination thereof.

Further, the adder 280 already described with reference to FIG. 2 adds the reconstructed residual block outputted from the inverse transformer 270 to the predicted block outputted from the predictor 210 to reconstruct the current block and stores the reconstructed current block in the memory 428. However, the first adder 426 adds the reconstructed residual block outputted from the first inverse transformer 424 to the predicted block outputted from the predictor 412 to output the reconstructed block, in which the reconstructed block is not stored in the memory 428, but is outputted to the subtracter 432 of the low frequency encoder 430. That is, the reconstructed current block outputted from the adder 280 becomes the finally reconstructed current block in the video encoding apparatus of FIG. 2. However, in the video encoding apparatus 400 according to the aspect of the present disclosure of FIG. 4, not the reconstructed block outputted from the first adder 426 but the reconstructed current block outputted from a second adder 444 of the low frequency encoder 430 becomes the finally reconstructed current block.

Here, the current block means a block to be currently encoded, and may be a macroblock or a subblock.

The low frequency encoder 430 encodes only a low frequency component of an error block generated by subtracting the reconstructed block from the current block to generate encoded low frequency data. Specifically, the low frequency encoder 430 may include a second subtracter 432, a second transformer 434, a second quantizer 436, and a second encoder 438, and may additionally include a second inverse quantizer 440, a second inverse transformer 442, and the second adder 444.

The second subtracter 432 subtracts the reconstructed block from the current block to generate an error block. Specifically, the second subtracter 432 subtracts the reconstructed block outputted from the first adder 426 of the image encoder 410 from the current block to be currently encoded in the input image to generate the error block. The reconstructed block outputted from the first adder 426 is similar to the current block because the reconstructed block outputted from the adder 426 is the block generated through encoding, decoding, and reconstructing of the current block. However, as described above, the error is generated in the process of the transform and the quantization of the residual block of the current block, and the reconstructed block generated through addition of the inversely quantized, inversely transformed, and reconstructed residual block and the predicted block also includes the error, so that the error block may be generated by subtracting the reconstructed block from the current block.

The second transformer 434 transforms the error block in second transform units to generate transform coefficients of the error block. Specifically, the second transformer 434 transforms error signals of the error block outputted from the second subtracter 432 into a frequency domain to generate the error block having the transform coefficient.

In this event, the second transformer 434 transforms the error signals of the error block in the second transform units. The second transform units may include at least one transform, and may be larger than the first transform units used for the predictive encoding of the current block and include a plurality of adjacent first transform units used for the predictive encoding of the current block.

Hereinafter, the first transform units and the second transform units will be described with reference to FIG. 5 which illustrates a first transform block and a second transform block according to the aspect of the present disclosure.

Figure 5:
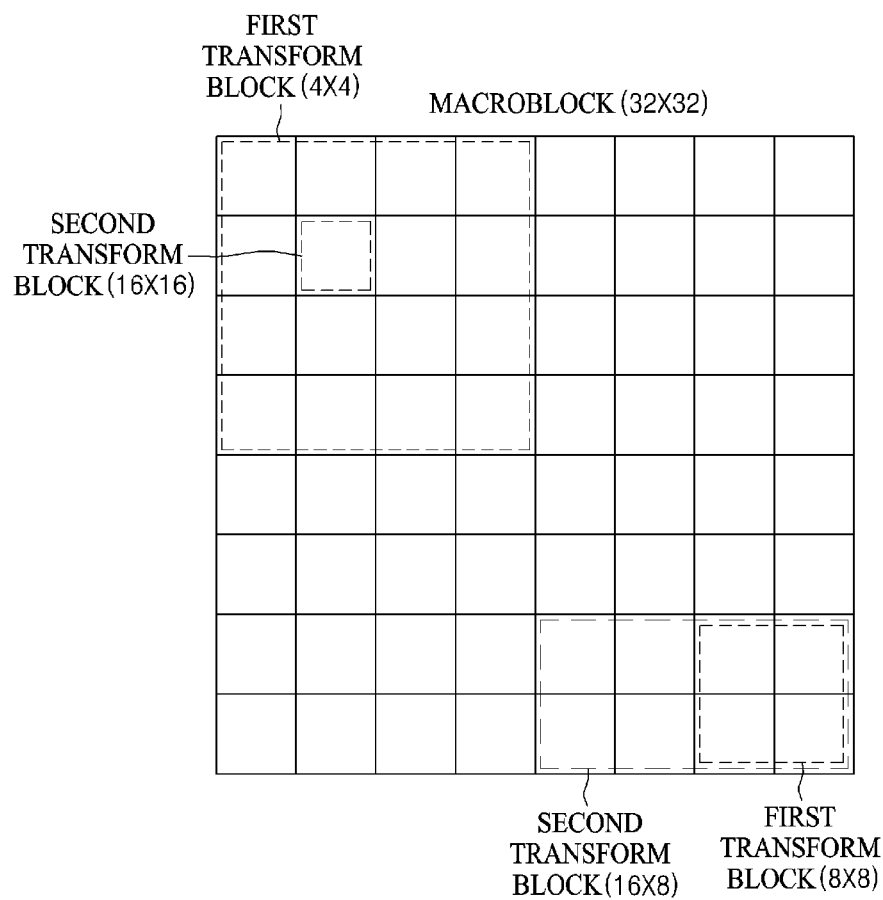
FIG. 5 is a diagram illustrating a first transform block and a second transform block according to an aspect of the present disclosure.

FIG. 5 illustrates an example of the first transform block used in the transform for the generation of the encoded image data and the second transform block used in the transform for the generation of the encoded low frequency data when it is assumed that the current block is a macroblock having the size of 32×32.

The first transformer 416 transforms residual signals of a residual block in the first transform units, and as illustrated in FIG. 5, the first transform units may be 4×4 transform or 8×8 transform. In addition, the first transform units may be the transform in a shape of a rectangle, such as 4×8 transform, 8×4 transform, and 16×8 transform, which, however, are not illustrated.

The second transformer 434 transforms error signals of the error block in the second transform units, and as illustrated in FIG. 5, the second transform units may be 16×16 transform or 16×8 transform. In addition, the second transform units may be the transform having various sizes and shapes, such as 8×8 transform and 8×16 transform, which, however, are not illustrated.

However, as illustrated in FIG. 5, the second transformer 434 may transform the error block by using the second transform units in the form of transform blocks including one or more transform blocks according the first transform units used in the transform of the residual block in the first transformer 416. The left-upper end of FIG. 5 illustrates an example, in which when the first transformer 416 uses the 4×4 transform as the first transform units, the second transformer 434 transforms the error block by using the 16×16 transform including sixteen 4×4 transforms used as the first transform unit. Further, the right-lower end of FIG. 5 illustrates an example, in which when the first transformer 416 uses the 8×8 transform as the first transform units, the second transformer 434 transforms the error block by using the 16×8 transform including two 8×8 transforms used as the first transform units. As described above, the second transform units may include one or more transforms, may be determined larger than the first transform units, and may be the transform including one or more transforms according to the first transform unit.

The second quantizer 436 quantizes a low frequency transform coefficient among the transform coefficients of the error block to generate the quantized low frequency transform coefficient. That is, the second quantizer 436 selects as many low frequency transform coefficients as a predetermined number or a number determined according to a predetermined criterion among the transform coefficients of the error block, and quantizes the selected low frequency transform coefficients to generate quantized low frequency transform coefficients.

Figure 6:
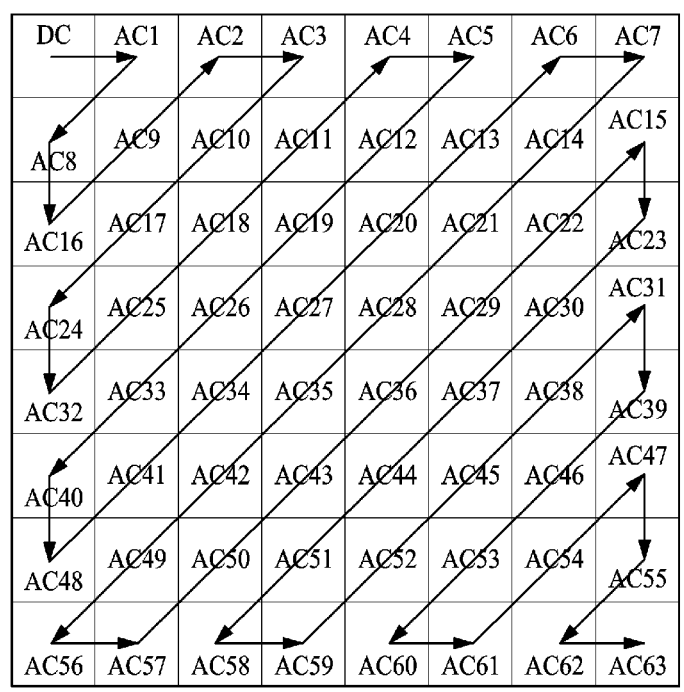
FIG. 6 is a diagram illustrating a process of selecting a low frequency transform coefficient according to an aspect of the present disclosure.

To this end, the second quantizer 436 may select the predetermined number of transform coefficients from a DC coefficient according to a zigzag scanning sequence among the transform coefficients of the transformed error block as the low frequency transform coefficients. Referring to FIG. 6 illustrating a process of selecting the low frequency transform coefficient according to the aspect of the present disclosure, the error block transformed by the second transformer 434 may include a plurality of transform coefficients as illustrated in FIG. 6. FIG. 6 illustrates an example of the error block transformed when the 8×8 transform is used as the second transform units. The error blocks transformed by using the 8×8 transform include 64 transform coefficients, i.e. one DC coefficient and 63 AC coefficients. Since the AC coefficients adjacent to the DC coefficient among the 63 AC coefficients are the low frequency transform coefficients, the second quantizer 436 may select the several number of transform coefficients from the DC coefficient (inclusive) as the low frequency transform coefficients in the zigzag scanning sequence.

Here, the several number may be one (in this case, the low frequency transform coefficient is the DC coefficient) or two (in this case, the low frequency transform coefficients are the DC coefficient and AC1 coefficient), and may have been already determined or be determined according to a predetermined criterion. Further, the selection of the several number of transform coefficients from the DC coefficient according to the zigzag scanning sequence as the low frequency transform coefficients by the second quantizer 436 is a representative method of selecting the low frequency transform coefficients, so the low frequency transform coefficients are not necessarily selected by the aforementioned method, and may be selected by other various methods.

The second encoder 438 encodes the quantized low frequency transform coefficient to generate the encoded low frequency data. Specifically, the second encoder 438 encodes the quantized low frequency transform coefficient by the entropy encoding or various encoding methods to generate the encoded low frequency data. However, in FIG. 4, the second encoder 438 is included in the low frequency encoder 430, but the second encoder 438 is omitted in the low frequency encoder 430 and its function may be included in the first encoder 420 of the image encoder 410.

Further, the second encoder 438 encodes flag information indicating that the low frequency components of the error block are encoded, to generate encoded flag data. That is, when the second encoder 438 generates the encoded low frequency data, the second encoder 438 may generate the flag information indicating that the low frequency components of the error block are encoded and encode the generated flag information, to generate the flag data. The flag information may be set as a flag of one bit. For example, when the flag is 1, the flag information may indicate that the low frequency components of the error block are encoded, and when the flag is 0, the flag information may indicate that the low frequency components of the error block are not encoded.

Further, the second encoder 438 may encode the number of quantized low frequency transform coefficients to generate the encoded low frequency coefficient data. The encoded low frequency coefficient data may be included in the bitstream to be transmitted to the video decoding apparatus, and be used for appropriately extracting and decoding the quantized low frequency data in the video decoding apparatus.

The second inverse quantizer 440 inversely quantizes the quantized low frequency transform coefficient to reconstruct the low frequency transform coefficient. Specifically, the second inverse quantizer 440 inversely quantizes the quantized low frequency transform coefficient outputted from the second quantizer 436 to reconstruct the low frequency transform coefficient. The inverse quantization process may be achieved by inversely performing the quantization process performed in the second quantizer 440.

The second inverse transformer 442 inversely transforms the reconstructed low frequency transform coefficient in the second transform units to reconstruct the error block. Specifically, the second inverse transformer 442 inversely transforms the low frequency transform coefficient reconstructed by the second inverse quantizer 440 in the second transform units to reconstruct the error block.

The inverse transform process may be achieved by inversely performing the transform process performed in the second transformer 434. Since the low frequency transform coefficients inversely quantized and reconstructed by the second inverse quantizer 440 include only the several number of transform coefficients selected from the transform coefficients generated through the transform in the second transform units, it is necessary to add the transform coefficients in accordance with the form of the block in the second transform units in order for the second inverse transformer 442 to inversely perform the transform process performed by the second transformer 434. To this end, as illustrated in FIG. 7 representing an example of the transform block generated through the combination of the additional transform coefficients, the second inverse transformer 442 may generate the transform blocks in the second transform units by additionally combining the low frequency transform coefficients with transform coefficients having a predetermined value, such as 0, and inversely transform the low frequency transform coefficient in the second transform units.

Further, contrary to the transform process performed by the second transformer 434, in the inverse transform process, the low frequency transform coefficients including the several number of selected transform coefficients generated through the transform in the second transform units may be individually inversely transformed. In this case, the second inverse transformer 442 may reconstruct the error block having the same size as that of the reconstructed bock by combining error signals reconstructed through the individual inverse transform of the low frequency transform coefficients with additional error signals having a predetermined value, such as 0.

The second adder 444 adds the reconstructed error block to the reconstructed block to reconstruct the current block. Specifically, the second adder 444 adds the error block reconstructed by the second inverse transformer 442 to the reconstructed block generated by the first adder 426 of the image encoder 410 to reconstruct the current block.

The bitstream outputted from the video encoding apparatus 400 may include the encoded image data outputted from the first encoder 420 of the image encoder 410 and the encoded low frequency data outputted from the second encoder 438 of the low frequency encoder 430, but may include the encoded image data without including the encoded low frequency data. Specifically, the first encoder 420 or the second encoder 438 may calculate an encoding cost (hereinafter, referred to as "a first encoding cost") when the bitstream includes the encoded image data and another encoding cost (hereinafter, referred to as "a second first encoding cost") when the bitstream includes the encoded image data and the encoded low frequency data, and output the bitstream including the encoded image data without the encoded low frequency data as the final bitstream when the first encoding cost is equal to or smaller than the second encoding cost, and output the bitstream including the encoded image data and the encoded low frequency data as the final bitstream when the first encoding cost is larger than the second encoding cost. Here, the encoding cost may be a rate-distortion cost, but may be any cost if the cost is consumed for the encoding.

In a video encoding method according to the aspect of the present disclosure, the video encoding apparatus 400 performs a predictive encoding on the current block to be encoded in the input image to generate the encoded image data and the reconstructed block, and encodes only the low frequency components of the error block generated by subtracting the reconstructed block from the current block, to generate the encoded low frequency data. The generated encoded image data and encoded low frequency data constitute the bitstream.

Here, the current block may be a macroblock or a subblock. Specifically, the video encoding apparatus 400 may generate the encoded image data and the encoded low frequency data in the unit of macroblocks to generate the bitstream for every picture or every frame, or generate the encoded image data and the encoded low frequency data in the unit of subblocks included in the macroblock to generate the bitstream for every macroblock.

Figure 8:
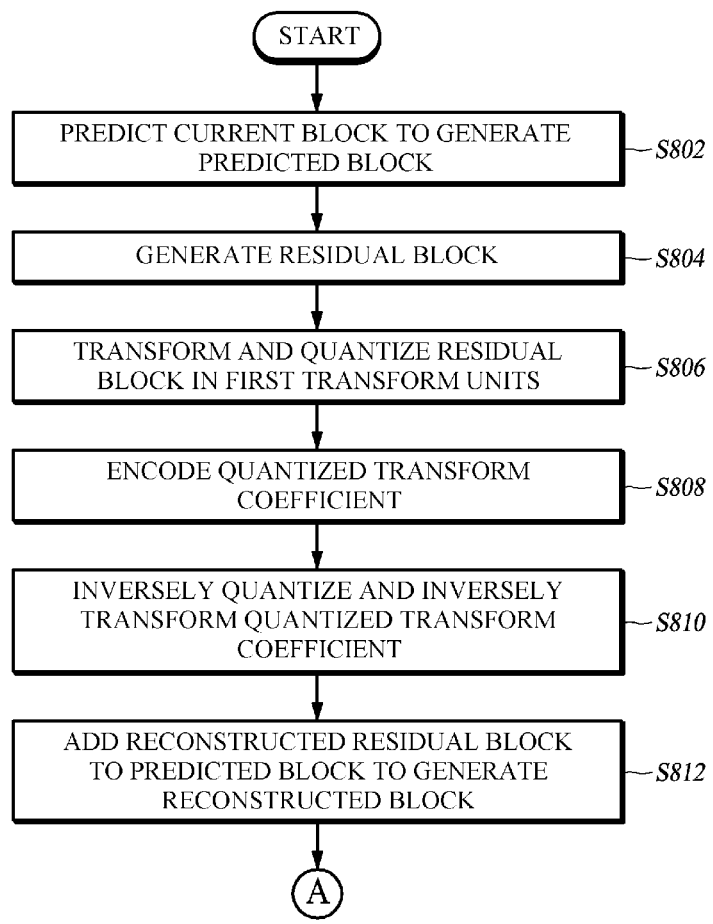
FIGS. 8 and 9 are a flowchart illustrating a video encoding method according to an aspect of the present disclosure.
Figure 9:
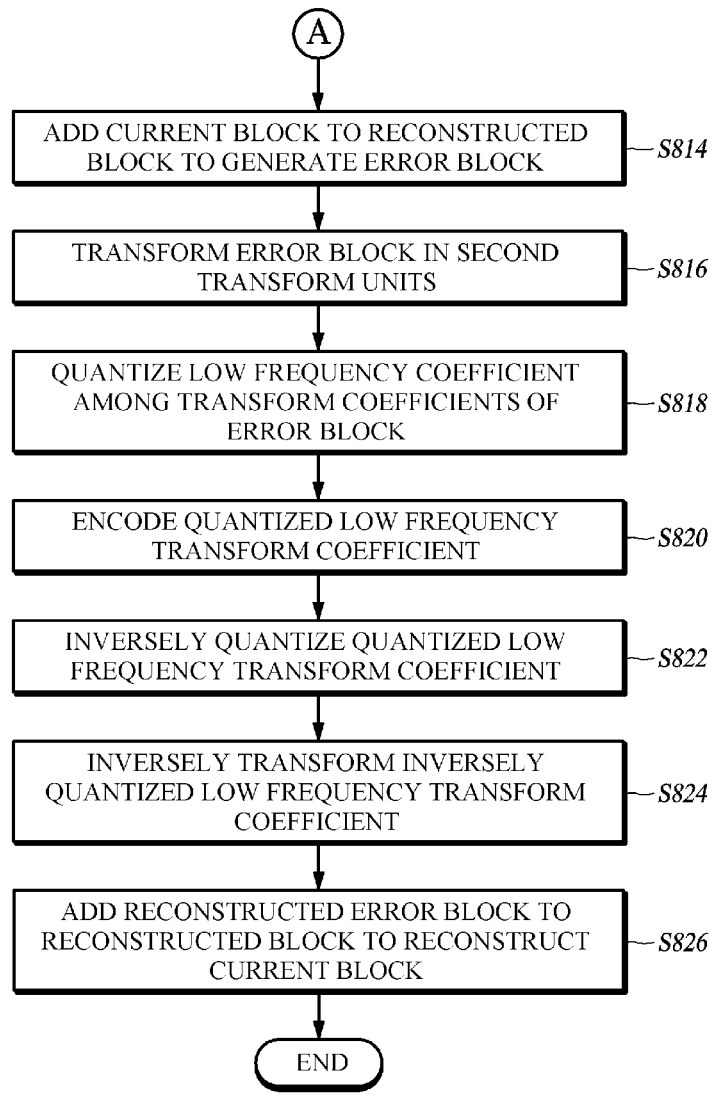

A video encoding method according to an aspect of the present disclosure may be specifically implemented as illustrated in FIGS. 8 and 9.

FIGS. 8 and 9 are a flowchart illustrating an example of the video encoding method according to an aspect of the present disclosure.

The video encoding apparatus 400 may predict a current block to generate a predicted block (S802), subtract the predicted block from the current block to generate a residual block (S804), transform and quantize the residual block in first transform units to generate quantized transform coefficients of the residual block (S806), and encode the quantized transform coefficients of the residual block to generate encoded image data (S808). Further, the video encoding apparatus 400 may inversely quantize and inversely transform the quantized transform coefficients of the residual block to reconstruct the residual block (S810), and add the reconstructed residual block to the predicted block to generate a reconstructed block (S812).

Further, the video encoding apparatus 400 may subtract the reconstructed block from the current block to generate an error block (S814), generate transform coefficients of the error block in second transform units (S816), select low frequency transform coefficients among the transform coefficients of the error block, quantize the selected low frequency transform coefficients to generate quantized low frequency transform coefficients (S818), and encode the quantized low frequency transform coefficients to generate encoded low frequency data (S820).

Here, the second transform unit may include one or more transforms, and may be larger than the first transform unit used for the predictive encoding of the current block and include a plurality of adjacent first transform units used for the predictive encoding of the current block.

Further, in step S818, the video encoding apparatus 400 may select a predetermined number of transform coefficients in a zigzag scanning sequence from a DC coefficient among the transform coefficients of the transformed error block as the low frequency transform coefficients.

Further, the video encoding apparatus 400 may inversely quantize the quantized low frequency transform coefficients to reconstruct the low frequency transform coefficients (S822), inversely transform the reconstructed low frequency transform coefficients to reconstruct the error block (S824), and add the reconstructed error block to the reconstructed block to reconstruct the current block (S826). At step S824, the video encoding apparatus 400 may combine error signals reconstructed through the inverse transform of the reconstructed low frequency transform coefficients and additional error signals to generate the error block.

Further, the video encoding apparatus 400 may encode flag information indicating that the low frequency components of the error block are encoded, to generate encoded flag data. In this case, the bitstream may include encoded image data, encoded low frequency data, and encoded flag data.

As described above, the image encoded into a bitstream by the video encoding apparatus 400 may be transmitted in real time or non-real-time to the video decoding apparatus via a wired/wireless communication network including the Internet, a short range wireless communication network, a wireless LAN network, a WiBro (Wireless Broadband) also known as WiMax network, and a mobile communication network or a communication interface such as cable or USB (universal serial bus), and decoded by the video decoding apparatus to be reconstructed and reproduced as a video.

Figure 10:
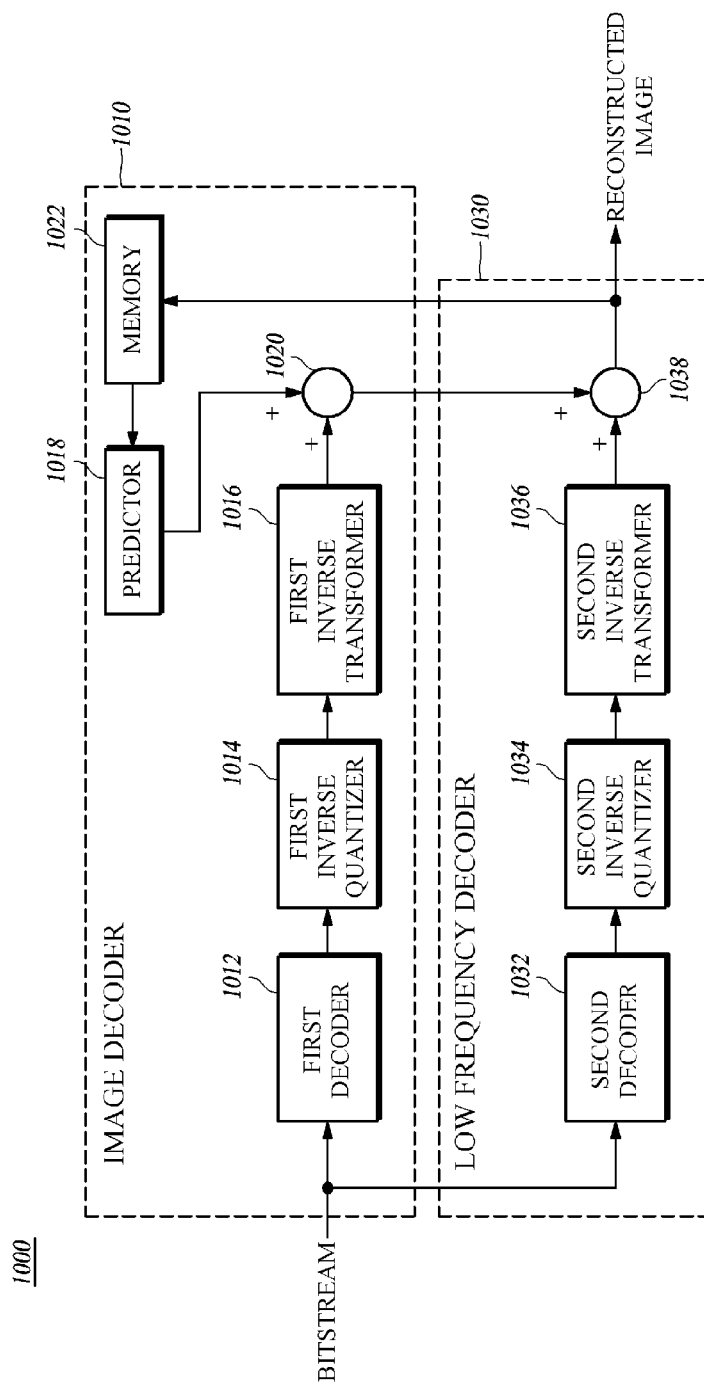
FIG. 10 is a block diagram schematically illustrating a video decoding apparatus according to an aspect of the present disclosure.

FIG. 10 is a block diagram schematically illustrating a video decoding apparatus according to an aspect of the present disclosure.

A video decoding apparatus 1000 according to the aspect of the present disclosure includes an image decoder 1010 and a low frequency decoder 1030. The video decoding apparatus 1000 may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communication between various devices or wired/wireless communication networks, a memory for storing various programs for decoding images and related data, and a microprocessor for executing the programs to effect operations and controls.

The image decoder 1010 performs a predictive decoding on encoded image data extracted from a bitstream to generate a reconstructed block. Specifically, the image decoder 1010 extracts encoded image data from a bitstream, decodes the encoded image data to reconstruct quantized transform coefficients, inversely quantizes and inversely transforms the reconstructed quantized transform coefficients in the first transform units to reconstruct the residual block, predicts the current block to generate a predicted block, and adds the reconstructed residual block to the predicted block to generate a reconstructed block.

To this end, as illustrated in FIG. 10, the image decoder 1010 includes a first decoder 1012, a first inverse quantizer 1014, a first inverse transformer 1016, a predictor 1018, a first adder 1020, and a memory 1022. The operations and functions of the first decoder, the first inverse quantizer 1014, the first inverse transformer 1016, the predictor 1018, the first adder 1020, and the memory 1022 are similar to or the same as those of the decoder 310, the inverse quantizer 320, the inverse transformer 330, the predictor 340, the adder 350, and the memory 360 already described with reference to FIG. 3, so their description will be omitted.

However, the first inverse transformer 1016 may transform the residual block in the first transform units in operation. The first transform units herein may be the same as the first transform units used in the first transformer 430 of the image encoder 410, such first transform units may be the transform in the form of a rectangle (i.e. P×Q transform, wherein P≠Q), such as 4×8 transform, 8×4 transform, 16×8 transform, and 8×16 transform, in which the number of transverse pixels is different from that of longitudinal pixels of the transform block. Further, the first transform units may be one of 4×4 transform, 8×8 transform, 16×16 transform, 4×8 transform, 8×4 transform, 16×8 transform, and 8×16 transform, or a combination thereof.

Further, the adder 350 described earlier with reference to FIG. 3 adds the reconstructed residual block outputted from the inverse transformer 330 to the predicted block outputted from the predictor 340 to reconstruct the current block and stores the reconstructed current block in the memory 360. However, the first adder 1020 adds the reconstructed residual block outputted from the first inverse transformer 424 to the predicted block outputted from the predictor 412 to output the reconstructed block, in which the reconstructed block is not stored in the memory 428, but is outputted to the subtracter 432 of the low frequency encoder 430. That is, the reconstructed current block outputted from the adder 280 becomes the finally reconstructed current block in the video encoding apparatus of FIG. 2. However, in the video encoding apparatus 400 according to the aspect of the present disclosure of FIG. 4, not the reconstructed block outputted from the first adder 426 but the reconstructed current block outputted from the second adder 444 of the low frequency encoder 430 becomes the finally reconstructed current block. Here, the current block means a block to be currently encoded, and may be a macroblock or a subblock.

The low frequency decoder 1030 decodes the encoded low frequency data extracted from the bitstream to reconstruct the error block, and adds the error block to the reconstructed block to reconstruct the current block. Specifically, the low frequency decoder 1030 extracts the encoded low frequency data from the bitstream, decodes the encoded low frequency data to reconstruct the quantized low frequency transform coefficients, inversely quantizes the reconstructed quantized low frequency transform coefficients to reconstruct the low frequency transform coefficients, and inversely transforms the reconstructed low frequency transform coefficients in the unit of the second transform unit to reconstruct the error block.

To this end, as illustrated in FIG. 10, the low frequency decoder 1030 includes a second decoder 1032, a second inverse quantizer 1034, a second inverse transformer 1036, and a second adder 1038.

The second decoder 1032 decodes the encoded low frequency data extracted from the bitstream to reconstruct the quantized low frequency transform coefficients. Specifically, the second decoder 1032 extracts the encoded low frequency data extracted from the bitstream and decodes the extracted low frequency data to reconstruct the quantized low frequency transform coefficients. The second decoder 1032 may decode the encoded low frequency data by inversely performing the same encoding method, such as the entropy encoding, as that used in the encoding of the quantized low frequency transform coefficients by the low frequency encoder 430.

Further, the second decoder 1032 may reconstruct information on the number of the quantized low frequency coefficients by extracting data of the number of the encoded low frequency coefficients from the bitstream and decoding the data, and appropriately extract the encoded low frequency data from the bitstream by using the number of the reconstructed quantized low frequency coefficients and decode the encoded low frequency data.

The operations and functions of the second inverse quantizer 1034, the second transformer 1036, and the second adder 1038 are similar to or the same as those of the second inverse quantizer 440, the second inverse transformer 442, and the second adder 444 of the low frequency encoder 430 described earlier with reference to FIG. 4. However, the second adder 444 stores the reconstructed current block in the memory 428, but the second adder 1038 not only stores the reconstructed current block in the memory 1022 but also outputs the reconstructed current block as a reconstructed image. That is, the reconstructed current blocks outputted from the second adder 1038 are accumulated in the unit of pictures to be reproduced as the reconstructed video.

The second transform units may include one or more transforms, be larger than the first transform units used for the predictive decoding of the encoded image data, and include a plurality of adjacent first transform units used for the predictive decoding of the encoded image data. The second transform units have been already described with reference to FIG. 5, so a detailed description will be omitted.

Further, the second inverse transformer 1036 may combine an error signal reconstructed through the inverse transform of the reconstructed low frequency transform coefficients and additional error signals to reconstruct the error block. Further, the second decoder 1032 may extract the encoded flag data from the bitstream and decode the extracted flag data to reconstruct the flag information, and only when the flag information reconstructed through extracting and decoding the encoded flag data indicates that only the low frequency components of the error block are encoded, the second decoder 1032 may decode the encoded low frequency data.

According to a video decoding method according to an aspect of the present disclosure, the video decoding apparatus 1000 predicts and decodes the encoded image data extracted from the bitstream to generate a reconstructed block, decodes the encoded low frequency data extracted from the bitstream to reconstruct the error block, and adds the error block to the reconstructed block to reconstruct the current block. Here, the current block may be a macroblock or a subblock.

Figure 11:
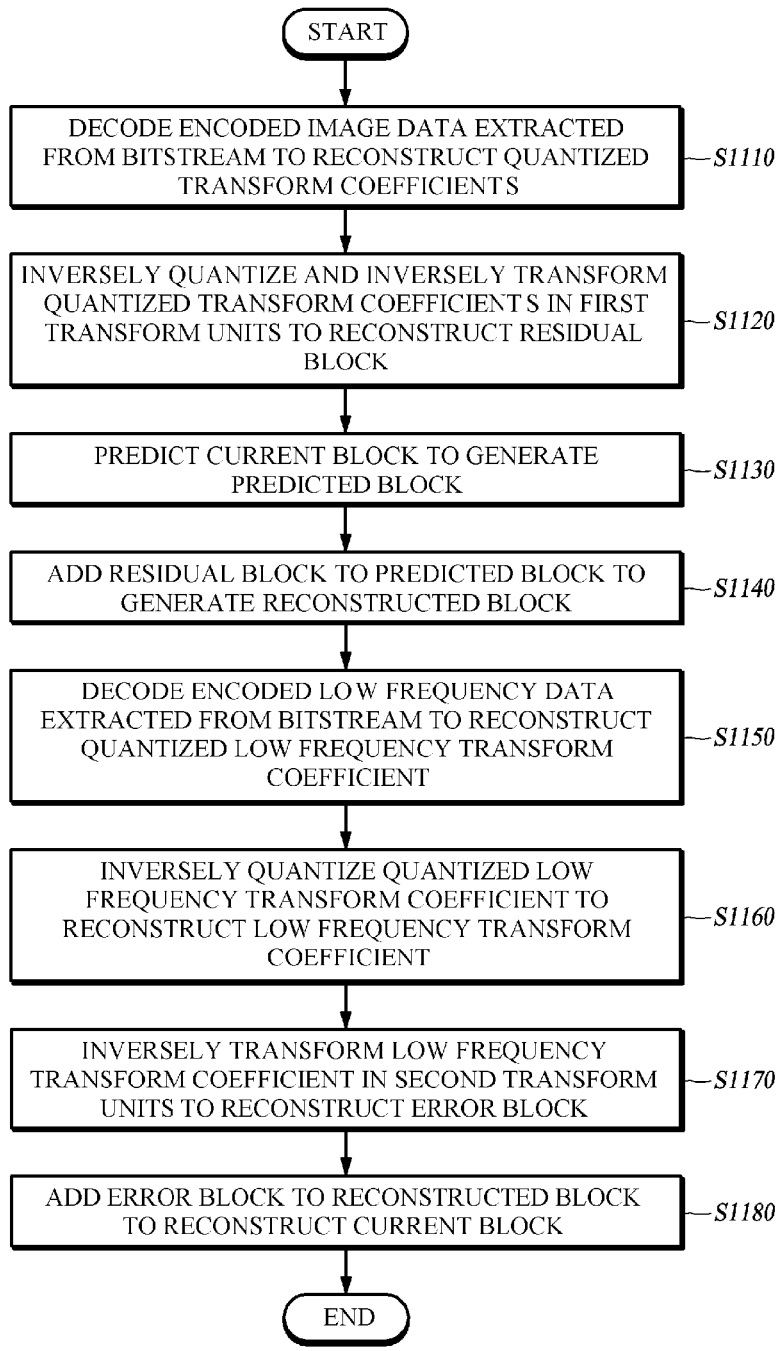
FIG. 11 is a flowchart illustrating a video decoding method according to an aspect of the present disclosure.

The video decoding method according to the aspect of the present disclosure may be specifically implemented as illustrated in FIG. 11.

FIG. 11 is a flowchart illustrating an implementation of the video decoding method according to the aspect of the present disclosure.

The video decoding apparatus 1000 extracts the encoded image data from the bitstream and decodes the encoded image data to reconstruct the quantized transform coefficients (S1110), inversely quantizes and inversely transforms the reconstructed quantized transform coefficients in the first transform units to reconstruct the residual block (S1120), predicts the current block to generate a predicted block (S1130), and adds the reconstructed residual block to the predicted block to generate the reconstructed block (S1140).

Further, the video decoding apparatus 100 extracts the encoded low frequency data from the bitstream and decodes the encoded low frequency data to reconstruct the quantized low frequency transform coefficients (S1150), inversely quantizes the reconstructed quantized low frequency transform coefficients to reconstruct the low frequency transform coefficients (S1160), inversely transforms the reconstructed low frequency transform coefficients in the second transform units to reconstruct the error block, and adds the error block to the reconstructed block to reconstruct the current block (S1180).

Here, the second transform units may include one or more transforms, be larger than the first transform units used for the predictive decoding of the encoded image data, and include a plurality of adjacent first transform units used for the predictive decoding of the encoded image data.

In step S1170, the video decoding apparatus 1000 may reconstruct the error block by combining the error signals reconstructed through the inverse transform of the reconstructed low frequency transform coefficients and the additional error signals.

Further, the video decoding apparatus 1000 may extract the encoded flag data from the bitstream and decode the encoded flag data to reconstruct the flag information. Accordingly, steps S1150 through S1180 may be performed only when the reconstructed flag information indicates that only the low frequency components of the error block are encoded.

In the description above, although all of the components of the aspects of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of compressing videos by encoding and decoding images, thereby improving the compression efficiency while reducing the blocking effects due to the transform and quantization operation through the encoding of the videos accounting for the low frequency components.

The invention claimed is:

1. A video encoding method performed by a video encoding apparatus, the method comprising:
generating a predicted block by predicting a current block;
generating a residual block by subtracting the predicted block from the current block;
generating quantized transform coefficients by transforming and quantizing the residual block;
generating the encoded image data by encoding the quantized transform coefficients;
reconstructing the residual block by inversely quantizing and inversely transforming the quantized transform coefficients;
generating a reconstructed block by adding the reconstructed residual block to the predicted block;
generating an error block by subtracting the reconstructed block from the current block;
generating encoded low frequency data by encoding one or more low frequency components of the error block, and
reconstructing the current block by adding the reconstructed block and a reconstructed error block generated from the error block.

2. The video encoding method as claimed in claim 1, wherein the current block is a macroblock or a subblock.

3. The video encoding method as claimed in claim 1, wherein the generating of the encoded low frequency data comprises:
generating transform coefficients of the error block by transforming the error block in;
selecting one or more low frequency transform coefficients from the transform coefficients of the error block;
generating quantized low frequency transform coefficients by quantizing the selected low frequency coefficients; and
generating the encoded low frequency data by encoding the quantized low frequency transform coefficients.

4. The video encoding method as claimed in claim 3, wherein the residual block is transformed using a first transform unit, and the error block is transformed using a second transform unit.

5. The video encoding method as claimed in claim 4, wherein the second transform unit is larger in size than the first transform unit.

6. The video encoding method as claimed in claim 4, wherein the second transform units include a plurality of adjacent first transform units.

7. The video encoding method as claimed in claim 3, wherein the reconstructing of the current block comprises:
reconstructing the low frequency transform coefficients by inversely quantizing the quantized low frequency transform coefficients;
reconstructing the error block by inversely transforming the reconstructed low frequency transform coefficients; and
reconstructing the current block by adding the reconstructed error block to the reconstructed block.

8. The video encoding method as claimed in claim 3, wherein the selecting of the low frequency transform coefficients selects a predetermined number of transform coefficients in a zigzag scanning sequence from a DC coefficient among the transform coefficients of the error block by the transforming, as the low frequency transform coefficient.

9. The video encoding method as claimed in claim 7, wherein the reconstructing of the error block reconstructs the error block by combining error signals reconstructed by inverse transforming the reconstructed low frequency transform coefficient with additional error signals.

10. The video encoding method as claimed in claim 1, further comprising generating encoded flag data by encoding flag information indicating whether or not the low frequency component of the error block is encoded.

11. A video encoding apparatus comprising:
an image encoder configured to
generate a predicted block by predicting a current block,
generate a residual block by subtracting the predicted block from the current block,
generate quantized transform coefficients by transforming and quantizing the residual block,
generate the encoded image data by encoding the quantized transform coefficients,
reconstruct the residual block by inversely quantizing and inversely transforming the quantized transform coefficients, and
generate a reconstructed block by adding the reconstructed residual block to the predicted block; and
a low frequency encoder configured to
generate an error block by subtracting the reconstructed block from the current block, and
generate encoded low frequency data by encoding one or more low frequency components of the error block,
wherein the low frequency encoder further comprises:
a second inverse quantizer configured to reconstruct the low frequency transform coefficients by inversely quantizing the encoded low frequency data;
a second inverse transformer configured to reconstruct the error block by inversely transforming the reconstructed low frequency transform coefficients; and
a second adder configured to reconstruct the current block by adding the reconstructed error block to the reconstructed block.

12. The video encoding apparatus as claimed in claim 11, wherein the low frequency encoder comprises:
a second subtracter configured to generate the error block by subtracting the reconstructed block from the current block;
a second transformer configured to generate transform coefficients of the error block by transforming the error block;

a second quantizer configured to generate a quantized low frequency transform coefficients by quantizing one or more low frequency transform coefficients among the transform coefficients of the error block; and a second encoder configured to generate the encoded low frequency data by encoding the quantized low frequency transform coefficients.

13. A video decoding method performed by a video decoding apparatus, the method comprising:

extracting the encoded image data from the bitstream;

reconstructing quantized transform coefficients by decoding the encoded image data;

reconstructing a residual block of a current block by inversely quantizing and inversely transforming reconstructed quantized transform coefficients;

generating a predicted block by predicting the current block;

generating a reconstructed block by adding the reconstructed residual block to the predicted block;

reconstructing an error block by decoding encoded low frequency data extracted from the bitstream, wherein the encoded low frequency data is encoded data of one or more low frequency components of the error block that is a difference between the current block and the reconstructed block; and reconstructing the current block by adding the reconstructed error block to the reconstructed block.

14. The video decoding method as claimed in claim 13, wherein the current block is a macroblock or a subblock.

15. The video decoding method as claimed in claim 13, wherein the reconstructing of the error block comprises:

extracting the encoded low frequency data from the bitstream;

reconstructing one or more quantized low frequency transform coefficients by decoding the encoded low frequency data;

reconstructing low frequency transform coefficients by inversely quantizing the reconstructed quantized low frequency transform coefficients; and reconstructing the error block by inversely transforming the reconstructed low frequency transform coefficients.

16. The video decoding method as claimed in claim 15, wherein the reconstructed quantized transform coefficients are inversely transformed using a first transform unit, and the reconstructed low frequency transform coefficients are inversely transformed using a second transform unit.

17. The video decoding method as claimed in claim 16, wherein the second transform unit is larger in size than the first transform units.

18. The video decoding method as claimed in claim 15, wherein the second transform units include a plurality of adjacent first transform units.

19. The video decoding method as claimed in claim 15, wherein the reconstructing of the error block reconstruct the error block by combining error signals reconstructed by inversely transforming the reconstructed low frequency transform coefficients with additional error signals.

20. The video decoding method as claimed in claim 13, further comprising reconstructing flag information by extracting encoded flag data from the bitstream and decoding the encoded flag data, wherein the reconstructing of the error block decodes the encoded low frequency data only when the reconstructed flag information indicates that the low frequency components of the error block are encoded.

21. A video decoding apparatus comprising:

an image decoder configured to
  extract encoded image data from the bitstream,
  reconstruct quantized transform coefficients by decoding the encoded image data,
  reconstruct a residual block of a current block by inversely quantizing and inversely transforming reconstructed quantized transform coefficients,
  generating a predicted block by predicting the current block, and
  generating a reconstructed block by adding the reconstructed residual block to the predicted block; and a low frequency decoder configured to
  reconstruct an error block by decoding encoded low frequency data extracted from the bitstream, wherein the encoded low frequency data is encoded data of one or more low frequency components of the error block that is a difference between the current block and the reconstructed block, and
  reconstruct the current block by adding the reconstructed error block to the reconstructed block, wherein the low frequency decoder comprises;

a second decoder configured to reconstruct one or more quantized low frequency transform coefficients by decoding the encoded low frequency data;

a second inverse quantizer configured to reconstruct low frequency transform coefficients by inversely quantizing the reconstructed quantized low frequency transform coefficients;

a second inverse transformer configured to reconstruct the error block by inversely transforming the reconstructed low frequency transform coefficients; and a second adder for reconstructing the current block by adding the reconstructed error block to the reconstructed block.

* * * * *